(12) United States Patent
Traetten et al.

(10) Patent No.: US 8,588,026 B2
(45) Date of Patent: *Nov. 19, 2013

(54) APPARATUS AND METHOD FOR DECOUPLING A SEISMIC SENSOR FROM ITS SURROUNDINGS

(75) Inventors: Oeystein Traetten, Asker (NO); Rafael Ryberg, Hvalstad (NO)

(73) Assignee: WesternGeco L.L.C., Houston, TX (US)

( * ) Notice: Subject to any disclaimer, the term of this patent is extended or adjusted under 35 U.S.C. 154(b) by 390 days.

This patent is subject to a terminal disclaimer.

(21) Appl. No.: 12/750,987

(22) Filed: Mar. 31, 2010

(65) Prior Publication Data

US 2011/0044129 A1 Feb. 24, 2011

Related U.S. Application Data

(60) Provisional application No. 61/235,735, filed on Aug. 21, 2009.

(51) Int. Cl.
*G01V 1/38* (2006.01)

(52) U.S. Cl.
USPC .......................................................... 367/20

(58) Field of Classification Search
USPC .............................................. 367/20, 17, 166
See application file for complete search history.

(56) References Cited

U.S. PATENT DOCUMENTS

| | | | |
|---|---|---|---|
| 4,402,069 A | 8/1983 | Miller et al. | |
| 4,410,012 A | 10/1983 | Redding et al. | |
| 5,682,925 A | 11/1997 | Seckel | |
| 5,777,954 A * | 7/1998 | Hepp | 367/20 |
| 5,943,293 A | 8/1999 | Luscombe et al. | |
| 6,185,154 B1 | 2/2001 | Miller | |
| 6,477,111 B1 | 11/2002 | Lunde et al. | |
| 7,298,672 B1 | 11/2007 | Tenghamn et al. | |
| 7,460,434 B2 | 12/2008 | Stenzel et al. | |
| 7,468,932 B2 | 12/2008 | Tenghamn | |
| 7,518,948 B2 | 4/2009 | Stenzel et al. | |
| 7,548,486 B2 | 6/2009 | Tenghamn | |
| 7,573,781 B2 | 8/2009 | Fernihough et al. | |
| 7,623,414 B2 * | 11/2009 | Boergen et al. | 367/178 |
| 7,693,005 B2 | 4/2010 | Stenzel et al. | |
| 7,872,942 B2 | 1/2011 | Sollner | |
| 2004/0017731 A1 * | 1/2004 | Halvorsen et al. | 367/166 |
| 2007/0195648 A1 | 8/2007 | Borgen et al. | |
| 2007/0258321 A1 | 11/2007 | Tenghamn | |
| 2007/0258331 A1 * | 11/2007 | Bevan et al. | 367/149 |

(Continued)

FOREIGN PATENT DOCUMENTS

| | | |
|---|---|---|
| GB | 2439816 | 1/2008 |
| WO | WO 2011022673 * | 2/2011 |

OTHER PUBLICATIONS

PCT Search Report, dated Feb. 28, 2011, Application No. PCT/US2010/046191.

(Continued)

*Primary Examiner* — Daniel Pihulic

(57) ABSTRACT

An apparatus includes a streamer having one or more sensor holders for retaining seismic sensors therein. A housing is disposed about a sensor with a gel-like material disposed between the housing and the sensor, thereby decoupling the sensor from its surroundings. The housing is disposed in the sensor holder and the streamer is filled with either liquid or another gel-like material.

24 Claims, 5 Drawing Sheets

(56) References Cited

U.S. PATENT DOCUMENTS

| | | |
|---|---|---|
| 2007/0258831 A1 | 11/2007 | Irick |
| 2007/0297286 A1* | 12/2007 | Stenzel et al. .................. 367/20 |
| 2008/0008034 A1 | 1/2008 | Tenghamn et al. |
| 2008/0074946 A1 | 3/2008 | Hillesund et al. |
| 2008/0175098 A1* | 7/2008 | Tenghamn ...................... 367/17 |
| 2008/0186803 A1 | 8/2008 | McKey et al. |
| 2009/0010101 A1 | 1/2009 | Lunde et al. |
| 2010/0039889 A1* | 2/2010 | Teigen et al. .................. 367/20 |
| 2010/0039890 A1* | 2/2010 | Tustin et al. ................... 367/20 |
| 2010/0165792 A1 | 7/2010 | Stenzel et al. |
| 2011/0044128 A1* | 2/2011 | Storteig et al. ................ 367/20 |
| 2011/0044129 A1* | 2/2011 | Traetten et al. ................ 367/20 |
| 2011/0044130 A1* | 2/2011 | Traetten et al. ................ 367/20 |
| 2011/0273957 A1* | 11/2011 | Guizelin et al. ............... 367/20 |

OTHER PUBLICATIONS

International Search Report and Written Opinion of PCT Application No. PCT/US2010/046197 dated Feb. 28, 2011: pp. 1-9.

International Search Report and Written Opinion of PCT Application No. PCT/US2010/046200 dated Feb. 28, 2011: pp. 1-8.

"OCS EIS/EA MMS 2006-038: Final Programmatic Environmental Assessment—Arctic Ocean Outer Continental Shelf Seismic Surveys—2006," Minerals Management Service Alaska OCS Region, 2006: pp. PEA-1-PEA-294.

* cited by examiner

APPARATUS AND METHOD FOR DECOUPLING A SEISMIC SENSOR FROM ITS SURROUNDINGS

CROSS-REFERENCE TO RELATED APPLICATIONS

This application claims the benefit of U.S. Provisional Patent Application No. 61/235,735, filed Aug. 21, 2009.

STATEMENT REGARDING FEDERALLY SPONSORED RESEARCH OR DEVELOPMENT

Not applicable.

BACKGROUND

This disclosure generally relates to towed streamers for use in acquiring seismic data, and more specifically, to apparatuses and methods for decoupling a seismic sensor within towed streamers from its surroundings.

Seismic exploration involves surveying subterranean geological formations for hydrocarbon deposits. A seismic survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

The present disclosure relates to an apparatus and method for decoupling a seismic sensor from its surroundings by using a gel to encompass the sensor and to hold the sensor in place when disposed in a seismic sensor holder.

Advantages and other features of the present disclosure will become apparent from the following drawing, description and claims.

DETAILED DESCRIPTION

Figure 1:
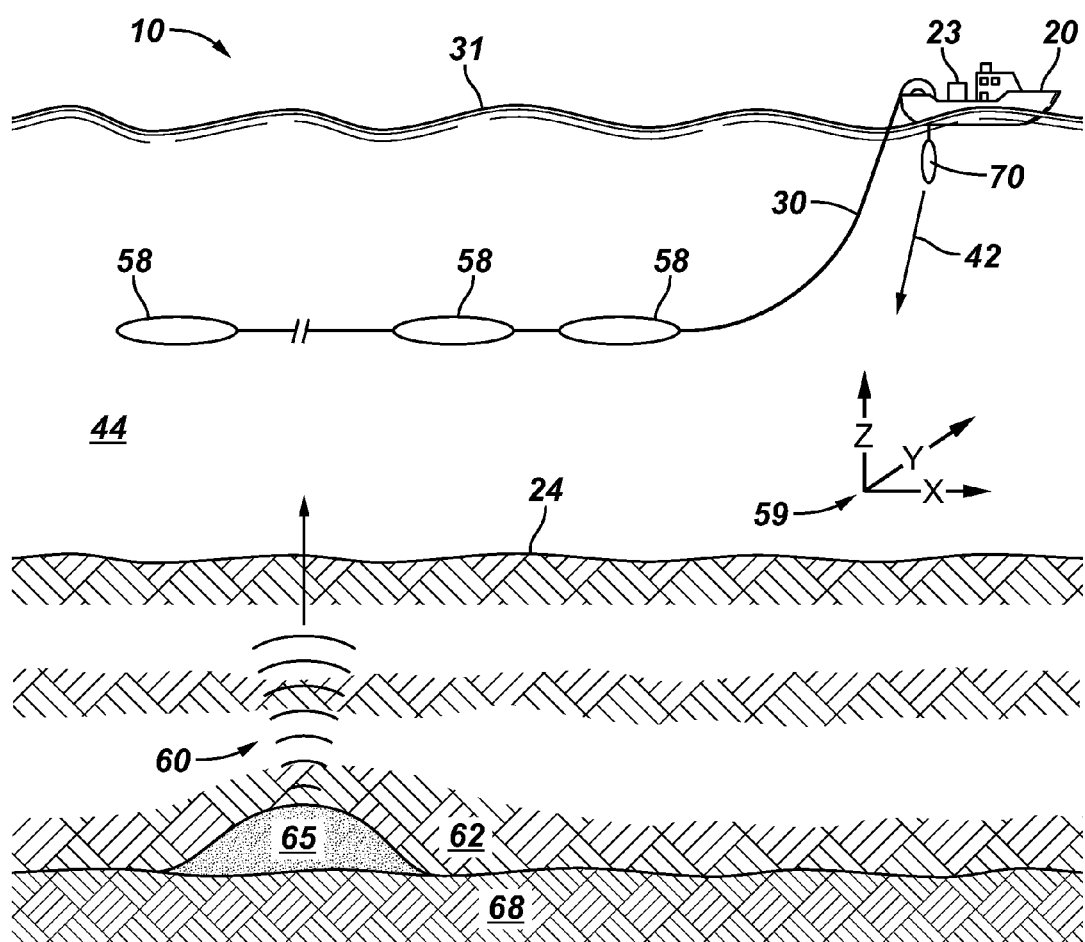
FIG. 1 is a schematic diagram of a marine seismic data acquisition system according to an embodiment of the disclosure.

FIG. 1 depicts an embodiment 10 of a marine seismic data acquisition system in accordance with some embodiments of the disclosure. In the system 10, a survey vessel 20 tows one or more seismic streamers 30 (one exemplary streamer 30 being depicted in FIG. 1) behind the vessel 20. The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors 58 that record seismic signals.

In accordance with embodiments of the disclosure, the seismic sensors 58 may be pressure sensors only or may be multi-component seismic sensors. For the case of multi-component seismic sensors, each sensor is capable of detecting a pressure wavefield and at least one component of a particle motion that is associated with acoustic signals that are proximate to the multi-component seismic sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the disclosure, the multi-component seismic sensor may include one or more hydrophones, geophones, particle displacement sensors, particle velocity sensors, accelerometers, pressure gradient sensors, or combinations thereof.

For example, in accordance with some embodiments of the disclosure, a particular multi-component seismic sensor may include a hydrophone for measuring pressure and three orthogonally-aligned accelerometers to measure three corresponding orthogonal components of particle velocity and/or acceleration near the seismic sensor. It is noted that the multi-component seismic sensor may be implemented as a single device or may be implemented as a plurality of devices, depending on the particular embodiment of the disclosure. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The marine seismic data acquisition system 10 includes a seismic source 70 that may be formed from one or more seismic source elements, such as air guns, for example, which are connected to the survey vessel 20. Alternatively, in other embodiments of the disclosure, the seismic source 70 may operate independently of the survey vessel 20, in that the seismic source may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic source 70 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 produce corresponding reflected acoustic signals, or pressure waves 60, which are sensed by the seismic sensors 58. It is noted that the pressure waves that are received and sensed by the seismic sensors 58 include "up going" pressure waves that propagate to the sensors 58 without reflection, as well as "down going" pressure waves that are produced by reflections of the pressure waves 60 from an air-water boundary 31.

The seismic sensors 58 generate signals (digital signals, for example), called "traces," which indicate the acquired measurements of the pressure wavefield and particle motion (if the sensors are particle motion sensors). The traces are recorded and may be at least partially processed by a signal processing unit 23 that is deployed on the survey vessel 20, in accordance with some embodiments of the disclosure. For example, a particular multi-component seismic sensor may provide a trace, which corresponds to a measure of a pressure wavefield by its hydrophone; and the sensor may provide one or more traces that correspond to one or more components of particle motion, which are measured by its accelerometers.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the disclosure, portions of the analysis of the representation may be performed on the seismic survey vessel 20, such as by the signal processing unit 23.

The main mechanical parts of a conventional streamer typically include skin (the outer covering); one or more stress members; seismic sensors; spacers to support the skin and protect the seismic sensors; and a filler material. In general, the filler material typically has a density to make the overall streamer neutrally buoyant; and the filler material typically has properties that make the material acoustically transparent and electrically non conductive.

Certain fluids (kerosene, for example) possess these properties and thus, may be used as streamer filler materials. However, a fluid does not possess the ability to dampen vibration, i.e., waves that propagate in the inline direction along the streamer. Therefore, measures typically are undertaken to compensate for the fluid's inability to dampen vibration. For example, the spacers may be placed either symmetrically around each seismic sensor (i.e., one spacer on each side of the sensor); or two sensors may be placed symmetrically about each spacer. The vibration is cancelled by using two spacers symmetrically disposed about the seismic sensor because each spacer sets up a pressure wave (as a result of inline vibration), and the two waves have opposite polarities, which cancel each other. Two seismic sensors may be disposed symmetrically around one spacer to achieve a similar cancellation effect, but this approach uses twice as many sensors. Furthermore, the latter approach may degrade performance due to nonsymmetrical positioning of the other seismic sensors.

When gel is used as the filler material, the noise picture changes, as flow noise (instead of vibration) becomes the dominant noise source. More specifically, the main mechanical difference between fluid and gel as a filler material is the shear stiffness. A fluid has zero shear stiffness, and shear stresses from viscous effects typically are negligible. The shear stiffness is what makes a gel possess solid-like properties. It has been discovered through modeling that the shear stiffness in gel degrades the averaging of flow noise. The degradation in the flow noise cancellation may be attributable to relatively little amount of gel being effectively available to communicate the pressure between each side of the spacer.

Figure 2A:
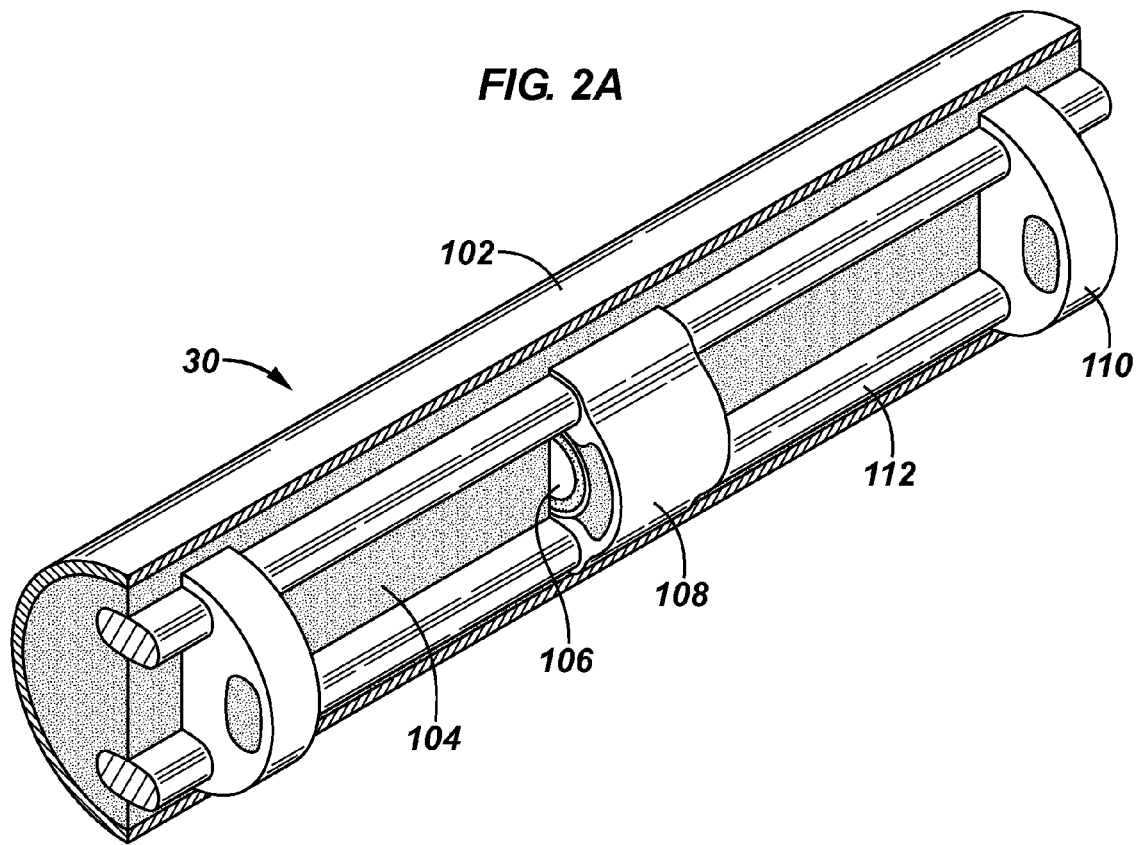
FIG. 2A is a partial broken-away, perspective view of a portion of a streamer according to an embodiment of the disclosure.

Referring to FIG. 2A, more specifically, in accordance with embodiments of the disclosure, an exemplary streamer 30 includes an outer skin 102 that defines an interior space that contains a gel 104, a filler material; seismic sensor elements 106 (one seismic sensor element 106 being depicted in FIG. 2) disposed in seismic sensor holder elements 108 (one seismic sensor holder element 108 being depicted in FIG. 2); spacers, such as exemplary spacers 110, which are located on either side of each sensor element 106; and strength members 112 that provide longitudinal support and attachment points for the spacers 110 and holder elements 108.

Figure 2B:
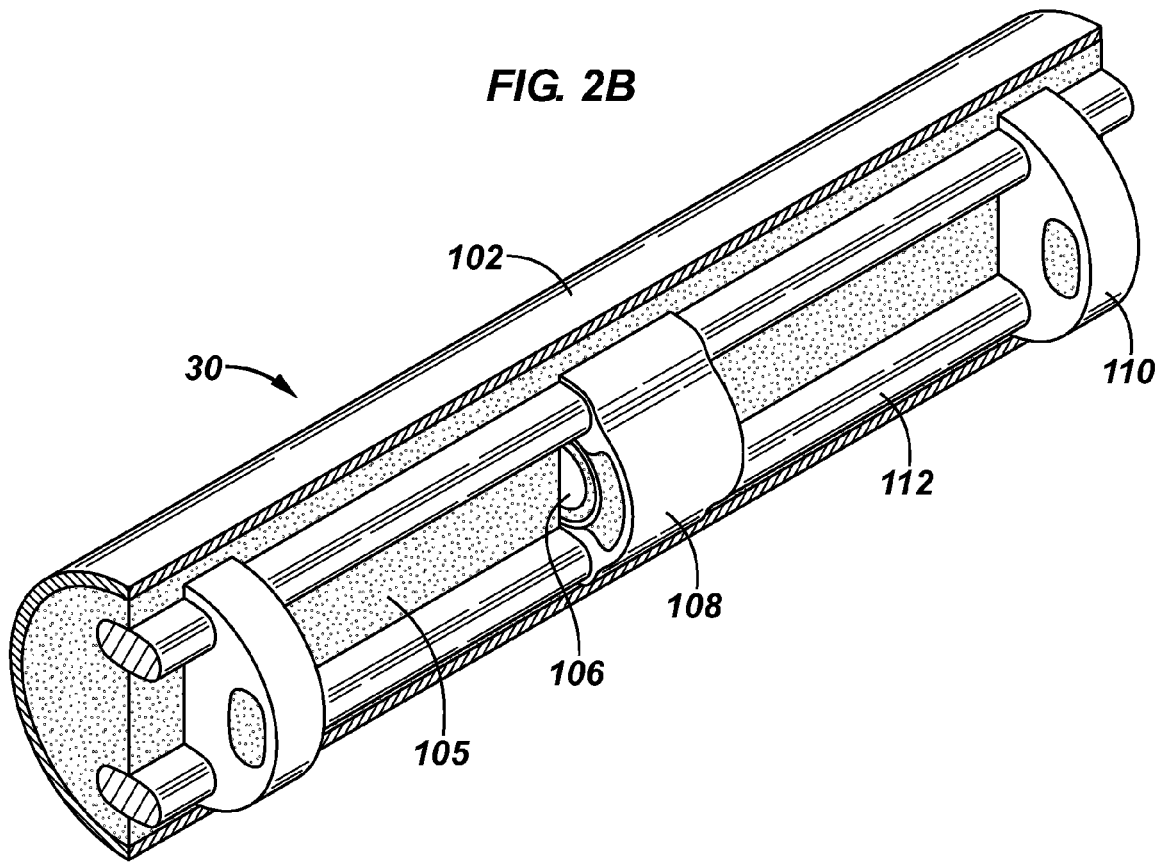
FIG. 2B is a partial broken-away, perspective view of a portion of a streamer according to another embodiment of the disclosure.

Referring to FIG. 2B, it is to be appreciated that the gel 104 may be replaced with a liquid 105. In some embodiments, the liquid 105 is a hydrocarbon-based liquid, such as kerosene. In other embodiments, the liquid 105 may be non-hydrocarbon-based.

Figure 3:
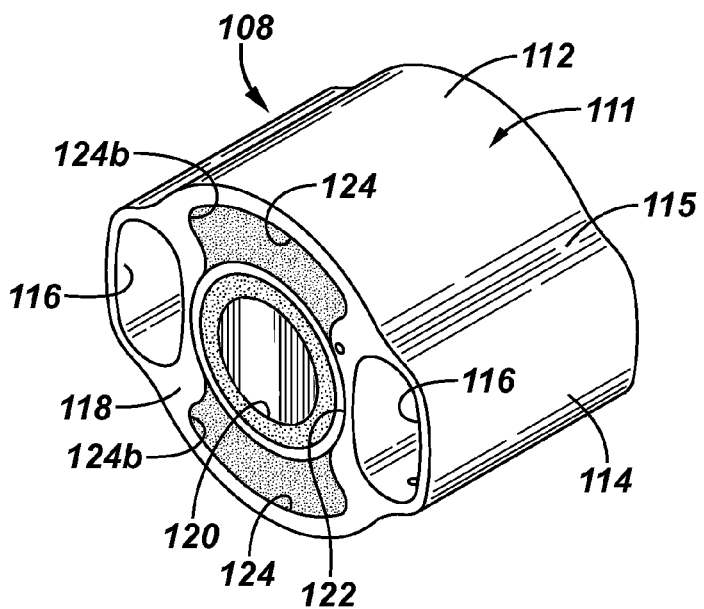
FIG. 3 is a front perspective view of a seismic sensor holder with sensor according to one embodiment of the disclosure.
Figure 4:
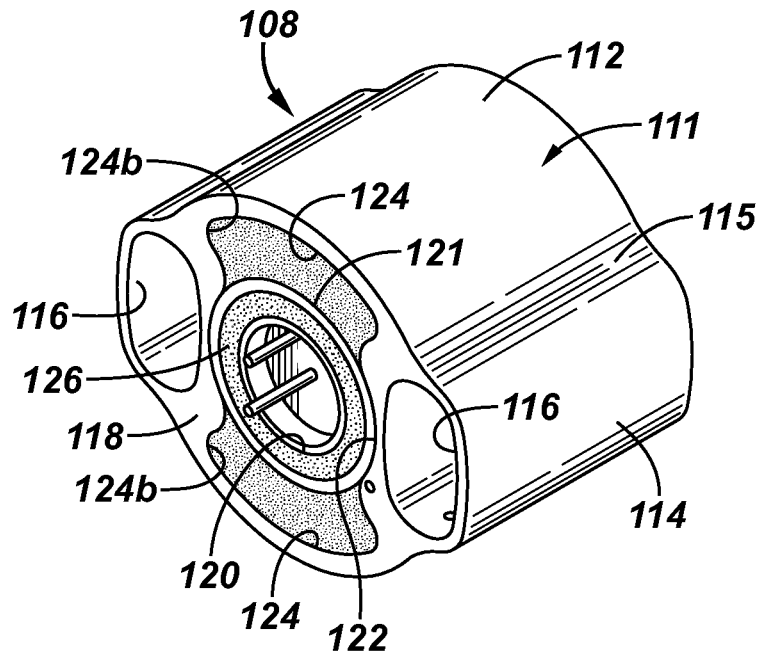
FIG. 4 is a rear perspective view of the seismic sensor holder with sensor of FIG. 3.
Figure 5:
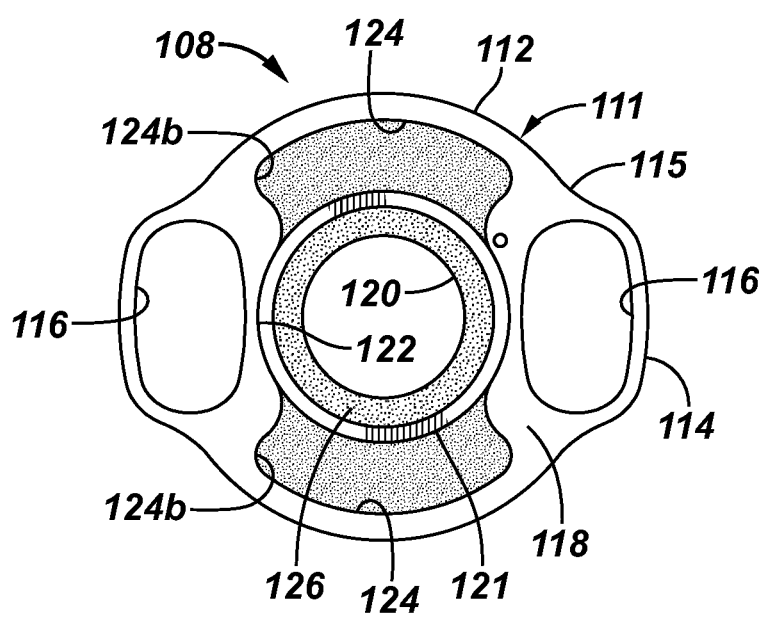
FIG. 5 is a front view of the seismic sensor holder with sensor of FIG. 3.

Referring to FIGS. 3-5, a sensor holder 108 may be used for positioning sensors throughout the streamer 30. In one embodiment, the sensor holder 108 includes an outer surface 111 having opposing curved portions 112 interrupted by opposing flange portions 114. The curved portions 112 and the flange portions 114 cooperate with one another to define a concave recess 115 at each intersection of the curved and flange portions. The reduced cross-sectional area of the sensor holder 108 achieved by formation of the concave recesses 115 between the curved and flange portions 112, 114, respectively, effectively increases gel continuity and coupling along the sensor holder. In some embodiments, the recesses 115 are positioned substantially concentrically about a sensor 120 disposed in the sensor holder 108. It is to be appreciated that each recess 115 may take on a configuration other than that of a concave configuration. For example, the recess 115 may be defined as a channel having straight sides that extend in either a parallel or non-parallel manner. Still further, the recess 115 may have a square, circle or oblong configuration when viewed in cross-section.

The sensor holder 108 further includes a pair of apertures 116 defined through the holder. The apertures 116 generally correspond to the flange portions 114 as they are defined between the flange portions 114 and a pair of inner walls 118 extending from one curved portion 112 to the other curved portion 112. The apertures 116 receive the strength members 112 (FIG. 2) therethrough to thereby couple the sensor holder 108 to the strength members.

As illustrated in FIGS. 3-5, the sensor holder 108 accommodates the sensor 120 therein. The sensor 120 may be any sensor used in the acquisition of seismic data, such as a hydrophone or accelerometer. Of course, embodiments of a multicomponent streamer employing both hydrophones and accelerometers are contemplated. The sensor 120 may be disposed in the sensor holder 108 in such a manner that the sensor is retained within the holder. In some embodiments, the sensor 120 may be disposed within a housing 121 that is pressure fit to the sensor holder 108. To accommodate a pressure fit, the inner walls 118 of the sensor holder 108 may include a curved recess 122 defined therein that matches the contour of the housing 121. The inner walls 118 further cooperate with the curved portions 112 to define a pair of apertures 124 on opposing sides of the housing 121. In some embodiments, the apertures 124 flare outward (see 124b in FIG. 3) from the curved recesses 122 to increase the area for gel or liquid to flow through. In some embodiments, optical and/or electrical wiring (not shown) may pass through the apertures 124 along the streamer. The apertures 124 communicate with the area defined between the curved recesses 122, essentially resulting in one large aperture through the middle of the sensor holder 108.

A gel 126 is used to couple the sensor 120 to the housing 121. In embodiments where filler gel 104 is utilized (as opposed to liquid 105), the gel 126 is a different type of gel relative to the filler gel 104. The gel 126 is disposed between the sensor 120 and the housing 121 and is generally of a denser nature relative to the filler gel 104. In some embodiments, the gel 126 may be a dielectric gel. The gel 126 may partially or completely encompass the sensor 120, thus decoupling the sensor from the surroundings.

The gel 126 may exhibit shock-absorbing properties, which permit the sensor 120 to be tested during assembly. The material properties (e.g., relative "softness") of the shock absorbing gel provide a dampener between the housing 121 and the sensor 120, decoupling the sensor from the strength member noise. In some embodiments, the shock absorbing gel 126 is not thermo-reversible (or thermo-sensitive), and thus it holds the sensor 120 in place while the filler gel 104 is placed in the streamer 30. The shock absorbing gel 126 also holds the sensor 120 in place if the streamer 30 is later heated to remove the filler gel 104 from the streamer for repair.

The filler gel 104 is generally less dense than the gel 126 and is buoyant to thus impart buoyancy to the streamer 30. In some embodiments, the filler gel 104 is a mixture of a polymer and hydrocarbon liquid and is thermoreversible.

Figure 6:
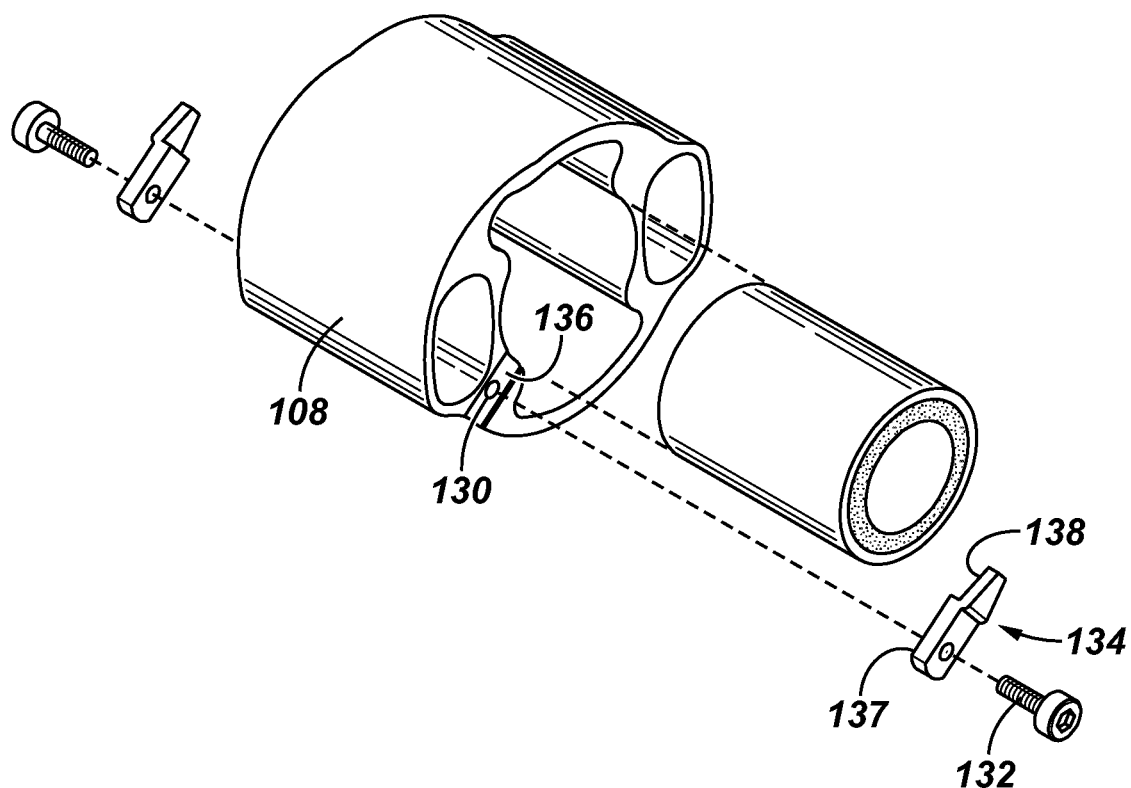
FIG. 6 is an exploded view of another embodiment of a seismic sensor holder according to the present disclosure.
Figure 7:
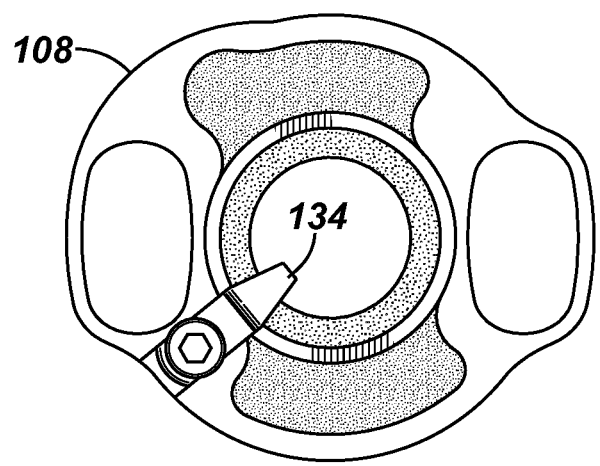
FIG. 7 is a front view of the seismic sensor holder of FIG. 6.

In some embodiments, the sensor holder 108 further includes a bore 130 formed therein to receive a screw or other connector device therein. For example, the bore 130 may be threaded to receive a threaded screw 132. Referring to FIG. 6, the screw 132 secures a lateral retaining element 134 that wholly or partially extends laterally across the sensor 120 to thereby function as a stopper. The stopper 134 may be employed on one or both sides of the sensor 120 to thus provide protection against ejection of the sensor from the sensor holder 108 during deployment or operation. In some embodiments, the stopper 134 includes a first portion 137, which secures to the sensor holder 108 and a second portion 138 that curves up and away from the first portion such that the stopper does not come into contact with the sensor. A groove 136 may be formed along a face of the sensor holder 108 to provide a recess for placement of the stopper 134. In some embodiments, with reference to FIG. 7, the sensor holder 108 may take an asymmetric configuration to accommodate placement of the stopper 134.

It is to be appreciated that various equivalents are contemplated within the present disclosure, such as the recesses and apertures taking on a different shape or orientation from that described herein.

While the present disclosure has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present disclosure.

What is claimed is:

1. An apparatus, comprising:
   a seismic streamer having at least one sensor disposed therein, the streamer being filled with a first gel;
   a sensor holder disposed in the streamer, the sensor being disposed in the sensor holder;
   a housing disposed in the sensor holder and surrounding the sensor; and
   a second gel disposed between the housing and the sensor, wherein the second gel is denser than the first gel.

2. The apparatus of claim 1, wherein the second gel encompasses the sensor to thereby decouple the sensor from the surroundings.

3. An apparatus, comprising:
   a seismic streamer having at least one sensor disposed therein, the streamer being filled with a first gel that is thermoreversible;
   a sensor holder disposed in the streamer, the sensor being disposed in the sensor holder;
   a housing disposed in the sensor holder and surrounding the sensor; and
   a second gel disposed between the housing and the sensor, wherein the second gel is not thermoreversible.

4. An apparatus, comprising:
   a seismic streamer having at least one sensor disposed therein, the streamer being filled with a first gel;
   a sensor holder disposed in the streamer, the sensor being disposed in the sensor holder;
   a housing disposed in the sensor holder and surrounding the sensor; and
   a second gel disposed between the housing and the sensor, wherein the second gel has at least one different material property relative to the first gel; and
   wherein the sensor holder comprises:
      a first pair of apertures defined on opposing sides of the sensor, the sensor being separated from the apertures by inner walls of the sensor holder; and
      a second pair of apertures defined on opposing sides of the sensor, whereby the second pair of apertures are in communication with the housing disposed about the sensor.

5. The apparatus of claim 4, wherein the sensor holder further comprises a pair of curved portions and a pair of flange portions, wherein the curved and flange portions cooperate to define concave recesses along an outer surface of the sensor holder.

6. An apparatus, comprising:
   a seismic streamer having at least one sensor disposed therein, the streamer being filled with a liquid;
   a sensor holder disposed in the streamer, the sensor being disposed in the sensor holder;
   a housing disposed in the sensor holder and surrounding the sensor; and
   a gel disposed between the housing and the sensor.

7. The apparatus of claim 6, wherein the liquid is a hydrocarbon-based liquid.

8. The apparatus of claim 6, wherein the liquid is a non-hydrocarbon-based liquid.

9. The apparatus of claim 6, wherein the sensor holder comprises:
   a pair of apertures defined on opposing sides of the sensor, the sensor being separated from the apertures by inner walls of the sensor holder; and
   a second pair of apertures defined on opposing sides of the sensor, whereby the second pair of apertures are in communication with the housing disposed about the sensor.

10. The apparatus of claim 9, wherein the sensor holder further comprises a pair of curved portions and a pair of flange portions, wherein the curved and flange portions cooperate to define concave recesses along an outer surface of the sensor holder.

11. A seismic spread, comprising:
a seismic streamer having at least one sensor disposed therein, the streamer being filled with a first gel;
a sensor holder disposed in the streamer, the sensor being disposed in the sensor holder;
a housing disposed in the sensor holder and surrounding the sensor; and
a second gel disposed between the housing and the sensor, wherein the second gel is denser that the first gel; and
a vessel for towing the seismic streamer.

12. The seismic spread of claim 11, wherein the second gel encompasses the sensor to thereby decouple the sensor from the surroundings.

13. A seismic spread, comprising:
a seismic streamer having at least one sensor disposed therein, the streamer being filled with a first gel that is thermoreversible;
a sensor holder disposed in the streamer, the sensor being disposed in the sensor holder;
a housing disposed in the sensor holder and surrounding the sensor; and
a second gel disposed between the housing and the sensor, wherein the second gel is not thermoreverible.

14. A seismic spread, comprising:
a seismic streamer having at least one sensor disposed therein, the streamer being filled with a liquid;
a sensor holder disposed in the streamer, the sensor being disposed in the sensor holder;
a housing disposed in the sensor holder and surrounding the sensor;
a gel disposed between the housing and the sensor; and
a vessel for towing the seismic streamer.

15. The apparatus of claim 14, wherein the liquid is a hydrocarbon-based liquid.

16. The apparatus of claim 14, wherein the liquid is a non-hydrocarbon-based liquid.

17. A method of marine seismic surveying, comprising:
towing a streamer, the streamer having at least one sensor disposed therein;
providing a housing for surrounding the sensor;
disposing a first gel between the sensor and the housing; and
filling the streamer with a second gel less dense than the first gel.

18. The method of claim 17, further comprising disposing the housing in a sensor holder disposed in the streamer.

19. A method of marine seismic surveying, comprising:
towing a streamer, the streamer having at least one sensor disposed therein;
providing a housing for surrounding the sensor;
disposing a gel between the sensor and the housing; and
filling the streamer with a liquid.

20. The method of claim 19, further comprising disposing the housing in a sensor holder disposed in the streamer.

21. An apparatus, comprising:
a seismic streamer having at least one sensor disposed therein, the streamer being filled with a first gel;
a sensor holder disposed in the streamer, the sensor being disposed in the sensor holder;
a housing disposed in the sensor holder and surrounding the sensor;
a second gel disposed between the housing and the sensor, wherein the second gel has at least one different material property relative to the first gel; and
a retaining element that extends at least partially and laterally across the sensor.

22. The apparatus of claim 4, wherein the first pair of apertures and the second pair of apertures are planar.

23. The apparatus of claim 4, further comprising an electrical wire passing through the second aperture.

24. The apparatus of claim 4, further comprising an optical link passing through the second aperture.

* * * * *